United States Patent
Trott

(10) Patent No.: US 10,574,737 B2
(45) Date of Patent: *Feb. 25, 2020

(54) COORDINATING AN ACTION BETWEEN DEVICES

(71) Applicant: Microsoft Technology Licensing, LLC, Redmond, WA (US)

(72) Inventor: James Leslie Trott, Cambridge (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 108 days.

This patent is subject to a terminal disclaimer.

(21) Appl. No.: 15/877,179

(22) Filed: Jan. 22, 2018

(65) Prior Publication Data

US 2018/0146028 A1    May 24, 2018

Related U.S. Application Data

(63) Continuation of application No. 14/849,229, filed on Sep. 9, 2015, now Pat. No. 9,876,852.

(30) Foreign Application Priority Data

Jul. 23, 2015  (GB) .................................. 1513008.1

(51) Int. Cl.
*H04L 29/08* (2006.01)
*H04L 12/26* (2006.01)

(52) U.S. Cl.
CPC .................................. *H04L 67/10* (2013.01)

(58) Field of Classification Search
CPC ......... H04L 67/02; H04L 67/10; H04L 67/28; H04L 67/2823; G06F 9/46; G06F 9/54

(Continued)

(56) References Cited

U.S. PATENT DOCUMENTS 6,202,099 B1 * 3/2001 Gillies .................... G06F 9/546
                                                                  719/317
6,973,034 B1 * 12/2005 Natarajan .............. A63B 53/04
                                                                  370/232

(Continued)

FOREIGN PATENT DOCUMENTS

| CA | 2506436 | 7/2004 |
|---|---|---|
| EP | 2840500 | 2/2015 |
| WO | WO 2013055973 | 4/2013 |

OTHER PUBLICATIONS

"Application Domains for Report Server Applications", Available at: https://msdn.microsoft.com/en-us/library/bb934330.aspx, Jan. 12, 2009, 2 pages.

(Continued)

*Primary Examiner* — Ruolei Zong
(74) *Attorney, Agent, or Firm* — Schwegman Lundberg & Woessner, P.A.

(57) ABSTRACT

Techniques for coordinating an action between devices are described. According to one or more implementations, a first device is designated as a reporter of an action type, and a second device is designated as a subscriber to the action type. In at least one implementation, the action type represents an action that can occur at an end user device. The first device and the second device include a platform agnostic code module that enable the devices to exchange communications, such as via an intermediate coordinator. When the first device detects that an instance of the action type occurs, the first device reports the action via the platform agnostic code module, and the second device is notified of the action via the platform agnostic code module.

20 Claims, 4 Drawing Sheets

(58) Field of Classification Search
USPC .......................................................... 709/203
See application file for complete search history.

(56) References Cited

U.S. PATENT DOCUMENTS

| | | | |
|---|---|---|---|
| 7,644,184 B2* | 1/2010 | Arora | H04L 69/08 |
| | | | 709/212 |
| 7,904,587 B2 | 3/2011 | Cousins et al. | |
| 8,140,978 B2 | 3/2012 | Betzler et al. | |
| 8,350,694 B1 | 1/2013 | Trundle et al. | |
| 8,554,190 B2 | 10/2013 | Smith et al. | |
| 8,607,223 B2 | 12/2013 | Fors et al. | |
| 8,627,291 B2 | 1/2014 | Dawson et al. | |
| 8,756,488 B2 | 6/2014 | Meredith et al. | |
| 8,803,808 B1 | 8/2014 | Smus | |
| 8,819,698 B2 | 8/2014 | Sandholm et al. | |
| 2003/0177279 A1 | 9/2003 | Evans | |
| 2003/0217190 A1 | 11/2003 | Devine et al. | |
| 2004/0203955 A1 | 10/2004 | White | |
| 2008/0046292 A1 | 2/2008 | Myers et al. | |
| 2008/0263547 A1* | 10/2008 | Saunier | G06Q 10/06 |
| | | | 718/100 |
| 2010/0287226 A1 | 11/2010 | Wright et al. | |
| 2011/0167403 A1 | 7/2011 | French et al. | |
| 2012/0216027 A1 | 8/2012 | Schneider | |
| 2012/0297041 A1 | 11/2012 | Momchilov | |
| 2012/0331110 A1 | 12/2012 | Scoda et al. | |
| 2013/0151595 A1 | 6/2013 | Fernandez-Ruiz et al. | |
| 2013/0219376 A1 | 8/2013 | Nelson | |
| 2013/0263160 A1 | 10/2013 | Sandholm et al. | |
| 2013/0339928 A1 | 12/2013 | Trofin et al. | |
| 2015/0372833 A1* | 12/2015 | Karp | G05B 15/02 |
| | | | 700/275 |
| 2016/0034322 A1* | 2/2016 | Braudes | H04L 65/403 |
| | | | 709/204 |
| 2017/0026459 A1 | 1/2017 | Trott | |

OTHER PUBLICATIONS

"International Search Report and Written Opinion", Application No. PCT/US2016/043030, dated Oct. 5, 2016, 12 pages.

"Mobile Web Apps vs. Mobile Native Apps: How to Make the Right Choice", www.lionbridge.com/files/.../Lionbridge-WP_MobileApps2. pdf, Apr. 24, 2013, 13 pages.

"Non-Final Office Action", U.S. Appl. No. 14/849,229, dated Jul. 13, 2017, 9 pages.

"Notice of Allowance", U.S. Appl. No. 14/849,229, dated Sep. 12, 2017, 8 pages.

"Progress Events", Available at: https://developer.chrome.com/native-client/devguide/coding/progress-events, Feb. 28, 2014, 8 pages.

"Telluride Saas", Retrieved on: Feb. 18, 2015 Available at: http://www.xprotean.com/index.php?option=com_content&view=article&id=112&Itemid=220, 2 pages.

Deursen,"NinSuna: a Fully Integrated Platform for Format-independent Multimedia Content Adaptation and Delivery using Semantic Web Technologies", In Proceedings of Multimedia Tools and Applications, vol. 46, Issue 2-3, Sep. 15, 2009, 3 pages.

Jahier,"Generic Program Monitoring by Trace Analysis", In Journal of Theory and Practice of Logic Programming, vol. 2, Issue 4-5, Jul. 2002, 38 pages.

Patel,"Introducing Xamarin Insights: Real-time Monitoring for Your Apps", Available at: http://blog.xamarin.com/monitoring-your-apps-with-xamarin-insights/, Oct. 8, 2014, 4 pages.

Schirner,"High-Level Development, Modeling and Automatic Generation of Hardware-Dependent Software", In Proceedings of Hardware Dependent Software: Principles and Practice, Feb. 18, 2015, 30 pages.

Trice,"Unified Multi-Platform Push Notifications with IBM MobileFirst", Available at: http://www.tricedesigns.com/2014/12/31/unified-multi-platform-push-notifications-with-ibm-mobilefirst/, Dec. 31, 2014, 6 pages.

* cited by examiner

COORDINATING AN ACTION BETWEEN DEVICES

RELATED APPLICATIONS

This application is a continuation of and claims priority to U.S. patent application Ser. No. 14/849,229 entitled "Coordinating Actions Across Platforms" and filed Sep. 9, 2015, which in turn claims priority under 35 USC 119 or 365 to Great Britain Application No. 1513008.1 filed Jul. 23, 2015, the disclosures of which are incorporated herein by reference in their entirety.

BACKGROUND

Increasingly it is desired to integrate systems providing two different services running on different platforms, either running on different operating systems, or programmed in different programming languages. For instance, large businesses now often have multiple disparate systems, which do not necessarily integrate well with each other. As another example, homes and offices are now typically filled with various connected devices, which often do not inter-communicate naturally, or even at all.

To coordinate the services provided by such systems, conventionally one has to design a dedicated, proprietary interface specifically for each particular pair of services. This usually involves either a complex system with large integration and implementation overhead, and high maintenance costs as new devices and systems are included, or extremely cost prohibitive bespoke development for specific systems and devices.

SUMMARY

Techniques for coordinating an action between devices are described. According to one or more implementations, a first device is designated as a reporter of an action type, and a second device is designated as a subscriber to the action type. In at least one implementation, the action type represents an action that can occur at an end user device. The first device and the second device include a platform agnostic code module that enable the devices to exchange communications, such as via an intermediate coordinator. When the first device detects that an instance of the action type occurs, the first device reports the action via the platform agnostic code module, and the second device is notified of the action via the platform agnostic code module.

According to one aspect disclosed herein, there is provided a coordinating server for coordinating between a first computerized service being a service of a first provider and a second computerized service being a service of a second provider (e.g. these could be two different companies, or two different departments within a company); wherein the first service operates based on a first platform comprising a first operating system and/or first programming language, whilst the second service operates based on a second, different platform comprising a second operating system and/or second programming language.

The coordinating server provides a directory comprising a respective action ID for each of a plurality of predefined types of action that can be performed by a human user through a user device of the user (e.g. clicking a certain button in a user interface of the user device, submitting a certain form through the device, or performing a certain motion detected by one or more motion sensors of the user device).

The coordinating server is configured to receive a request from the first service requesting that the first service become a reporter of one of said types of action. In response, it maps an ID of the first provider, as a reporter ID, to the respective action identifier in an entry of the directory. This thereby defines an event that will be deemed to occur when the user performs the respective type of action whilst using the first service. The coordinating server is also configured to receive a request from the second service requesting that the second service become a subscriber to said event. In response, it maps an ID of the second provider, as a subscriber ID, to said event in said entry of the directory.

Further, the coordinating server is configured to issue a respective instance of a platform agnostic code module to each of the first service and the second service. The platform agnostic code module is a module configured to run on any of multiple different platforms, including the different first and second platforms of the first and second services, and to thereby enable the first service and second service to interact with the coordinating server.

In operation, the coordinating server receives from the first service, via the instance of the platform agnostic code module run by the first service, an indication of an occurrence of said one of the types of action, thereby indicating an occurrence of said event. Based on said directory, the coordinating server then sends the respective action ID for said event to the second service, via the instance of the platform agnostic code module run by the second service, thereby causing the second service to serve one of the one or more user devices of said user in response to said event. This sending step could be in response to the indication of the event occurring being received from the first service, or The action ID thus acts a universal identifier allowing for common description of events across platforms. Further, the platform agnostic code mode enables the services to seamlessly access the reporting and subscribing functionality mentioned above regardless of their particular local implementation (and potentially access other related functionality such as allowing the first server to add new action types, or translating between the action ID and a proprietary definition of the action used by the first or second service)

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in the Background section

BRIEF DESCRIPTION OF THE DRAWINGS

To assist understanding of the present disclosure and to show how embodiments may be put into effect, reference will be made by way of example to the accompanying drawings in which.

DETAILED DESCRIPTION OF EMBODIMENTS

The following describes a system allowing parties such as implementers, end-users and/or consumers, to create logical instruction sets that can be executed on disparate systems or devices, either independently, or based on feedback events from the devices and applications that are within the system. This is implemented through software enabling third party systems or devices to report events or execute instructions based on feedback from a central coordination service, which provides its own integration package dynamically to minimise integration overhead for third party implementers. Consuming system(s) or device(s) can then expose temporary or permanent access to areas or functionality based on actions taken in other disparate and totally disconnected systems.

To achieve this, the system provides for the centralisation of a store of unique keys, that map to specific (any or all) users' devices, events and executable actions, and which can be used to coordinate data between these systems in a straightforward manner. Further, the system is able to provide to the consuming service (whether implemented on a server or an application running on a user device or a combination of the two), a software component 'executable' or 'library' which provides a consumable API (application programming interface) for communicating with the system, which is interpreted JIT (just in time) and in real time. This allows for seamless integration with minimal effort from consuming third parties, and for dynamic updateability of the system without downtime or upgrade cost to consumers.

In embodiments, where anything is attributed an ID (e.g. action ID: AID, user ID: UID, reporter ID: RID, subscriber ID: SID, system ID: SYID) these IDs are globally unique and subsequently listed in a directory where implementers can look them up and cross reference with human understandable definitions.

The platform agnostic code module, provides the integration points, but also upon request maps the actions, users and system/app requesting to unique ids, performing its own integration to the requesting system based on parameters provided, if none are provided then a default mapping and parameter set are assumed.

Figure 1:
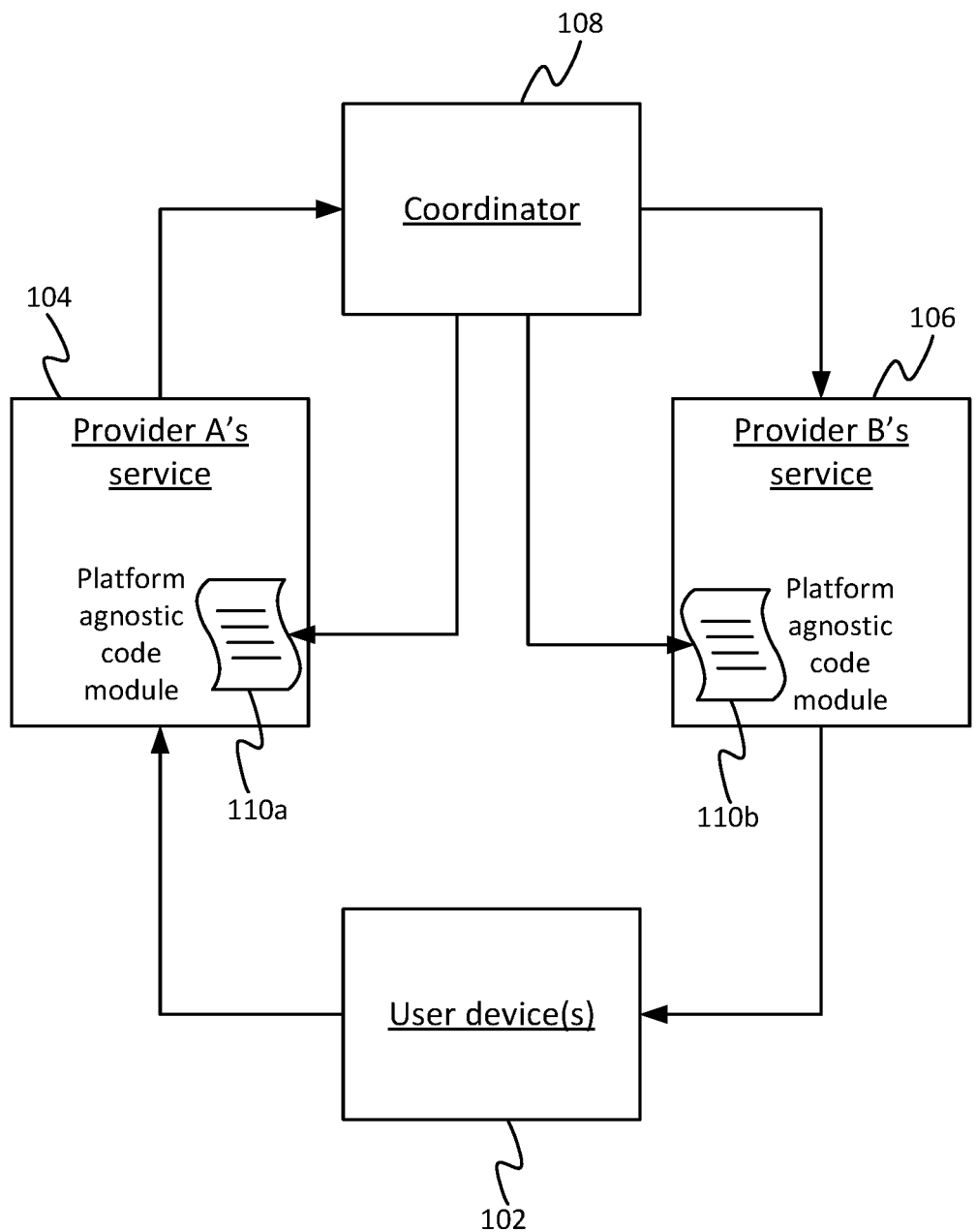
FIG. 1 is a schematic block diagram of a communication system in accordance with the present disclosure.

FIG. 1 illustrates a system in accordance with various embodiments disclosed herein.

The system comprises: one or more user devices 102, a first computerized service 104 provided by a first provider A, a second computerized service provided by a second provider B, and a coordinator service 108 for coordinating the operation of the first and second services 102, 104 (i.e. for integrating the services, to make them able to interact with one another to provide a synergistic result to the end user of the user devices(s) 102). Each of the one or more user devices 102 may take any suitable form, such as a smartphone, tablet, laptop, desktop computer or set-top box. The coordinator 108 is implemented on a server of an operator of the coordinator service. The first service 104 may be implemented on a server of the first provider A, or in an application provided by the first provider A but run on one of the user's user devices 102, or a combination of the server of the first provider and an application provided by the first provider to run on the user device 102. Similarly, the second service 106 may be implemented on a server of the second provider B, or in an application provided by the second provider B but run on one of the user's user devices 102, or a combination of the server of the second provider and an application provided by the second provider to run on the user device 102.

In order to perform the various communications discussed herein, the first service 104 is arranged to be able to communicate with at least one of the user devices 102, and with the coordinator 108; and the second service is arranged to be able to communicate with at least one of the user devices 102, and also with the coordinator 108. Any of the various described communications between any of these elements could be by any of various means, e.g. via any of one or more networks such as the Internet, or other wired or wireless network such as a company intranet, local wireless area network, or a mobile cellular network.

The first and second services 104, 106, are services which serve end-users via their user devices, including the user of the one or more user devices 102 illustrated in the figure. For example, they could comprise online shopping; services providing information such as maps, alerts or advertising to users; or services enabling users to submit information such as financial information or completed surveys to the respective service. The coordinator 108 does not provide a service to the end users (at least not directly), but rather serves the downstream providers A, B with a coordination service, enabling them to integrate their services to the end users. Note that many more downstream providers analogous to the first and second providers A, B may be served by the coordinator 108, to enable integration of various services to end users in various combinations, but for the sake of illustration only two providers A, B are illustrated here.

The two providers A, B could be two different companies who wish to operate together to provide some synergistic result to the user. In this case the operator of the coordinator service 108 could be an independent party making its integration functionality available to the first and second providers A, B and potentially various other providers who may wish to integrate in various combinations. Alternatively the two providers A, B could be different departments fulfilling different roles within the same company. In this case the coordinator could be an internal function provided within the company, or again could be implemented by an external party serving the company (and potentially) with integration services.

Different downstream providers of services to end users in general will tend to use a variety of different platforms to implement their respective services. This includes the first provider A using a first platform to implement the first service 104, and the second provider B using a second, different platform to implement the second service 106. Different platform here means a different operating system and/or a different code environment (such that any updates or add-ons to the service would have to be written in that programming language). In embodiments, each service 104, 106 also uses its own internal proprietary protocol to detect actions performed by the user through the user device(s) 102.

To integrate the two services 104, 106, it desired that when a user performs an action through a user device 102 as part of using the first service 104, this can be reported to the second service 106 in order for the second service 106, in response, to serve a user device 102 of the user (not necessarily the same device though which the action was performed) with an associated service related to the performance of the action in question.

As an example, the first provider A may be a vendor of a certain product (goods or services) such as airline tickets, who provides a service 104 for purchasing the product online through a user terminal 102. In this example the first provider A wishes to work in collaboration with another provider B to implement a loyalty rewards scheme, whereby the user receives loyalty points in exchange for making purchases via the first service, with the rewards scheme being implemented by provider B. I.e. when the user makes a purchase through the first service 104, this should trigger the second service 106 to record a corresponding amount of reward points and send a message to the user informing him or her of the reward (or perhaps make the record available through an online profile when the user logs in to the second service). However, provider A may not wish to have to design a dedicated proprietary API in order to be able to interact with B, nor be tied by such to using provider B in perpetuity as the provider of the rewards scheme.

Another example is to "gameify" completion of certain workflows within a company. For instance, the first service 104 may be the computer system used by a human resources department to enable users to submit certain employment related documents such as a P60, or an accounting department to submit certain accounting related documents such as a tax return. The idea of "gameifying" is to attribute credit to completion of certain tasks, as if the user is scoring points in a game, and thereby providing an incentive for completing as many tasks as possible. Despite having a number of disparate systems within the company, such as an HR system and an accounting system, etc. (each of which could potentially be the first service 104), the company may wish to provide this gameified scheme in a unified fashion. To do this, a second service 106 may be deployed which implements the keeping score of the work credit which the user may receive for completing the various tasks covered under the scheme.

To enable such applications or others, the coordinator 108 provides an upstream service to the downstream providers 104, 106 allowing the first service 104 to report occurrence of the relevant activity—e.g. making an online purchase or submitting a certain document—to the central coordinator service 108 based on a system of universal action IDs, as will be discussed in more detail in the following. The combination of a particular action being reported from the service of a particular provider (in this case A) defines an event. Optionally other conditions may also be attached to the event, e.g. a particular action performed by a particular user being reported from a particular service 104, or a particular action being reported from a particular subsystem of the particular service 104. A provider of another, cooperating service 106 such as B can then subscribe to the event through the coordinator service 108, such that the coordinator 108 will inform the second provider 106 about occurrences of the event, again using the system of universal action IDs. The report to the second service 106 may be pushed from the coordinator 108 onto the second service 106 straight away in response to the occurrence of the event being indicated to the coordinator 108 by the first service 104. Alternatively the coordinator 108 may wait to receive a request from the second service 106 querying whether the event has occurred, at which point the coordinator 108 replies accordingly. Either way, in response to being thus informed of the occurrence of the event, the second service 106 then performs the relevant complementary service, e.g. issuing reward points or work credit.

Further, to enable the described interaction with the coordinator 108, the coordinator 108 is configured to issue each of the downstream providers making use of the coordinator 108 with a respective instance of a platform agnostic code module 110. Hence the first service 104 is issued with a first instance 110a of the platform agnostic code module, and the second service 110a is issued with a second instance 110a of the platform agnostic code module. The code module 110 is issued at least once before the provider in question initially uses the coordinator 108, and optionally may be updated at later times as well. The function of the code module 110 is to enable the first and second providers 104, 106 to communicate with the coordinator 108 in order to access the functionality described herein, regardless of the platform—i.e. operating system and/or code environment— used by the respective provider A, B. To do this, the platform agnostic code module is implemented in a standard consumable language such as Java script, Python or Pearl that is commonly recognized by many platforms. When run on the respective service 104, 106, the code module 110 is interpreted in real time. It is configured so as when run to expose an API to the coordinator service 108, and thereby perform the relevant handshaking with the coordinator 108 and the subscription monitoring.

Thus through the system of universal IDs combined with a platform agnostic code module 110, a first provider A is able to integrate its service 104 with the service 106 of another provider B, without needing to design a dedicated interface specific to the particular pairing of A and B. Another effect is that if A wants to change partner or add a new partner, it doesn't have to design a new interface, but rather just gets another provider C to subscribe to its reports via the coordinator 108 instead of B (or in addition to B). E.g. in the example where A is an airline selling tickets online, and B is a partner implementing the rewards scheme, if A wishes to work with a new rewards scheme provider C (either instead of or in addition to B).

To elaborate, the coordinator 108 maintains a directory comprising an action ID (AID) for each of a plurality of possible predetermined actions. Optionally the directory may also contain metadata associated with each of one or more of the action IDs, such as a human readable string to help the human implementers of the services 104, 106 identify the purpose of each AID. Hence the directory may the following form.

| AID | Metadata |
|---|---|
| abc012 | "opened window" |
| bcd123 | "closed window" |
| cde234 | "clicked OK" |
| def345 | "submitted form" |
| efg456 | "payment authorized" |
| fgh567 | "submitted tax return" |
| ghi678 | "completed survey" |
| ... | ... |

Each of the action IDs corresponds to a respective type of action that may be performed by a human user, as part of using a user device 102 to use a service such as the first service 104. For instance the action could be a particular user input via a graphical user interface by means of a mouse or touchscreen, or could be a motion performed explicitly (deliberately) or implicitly (incidentally) by the user and detected by one or more motion sensors of the user device 102 (e.g. the user moves an arm holding the user device 102 and this is detected by an accelerometer on board the device 102).

In embodiments, each of the action IDs is a globally unique. That is to say, the ID is unique throughout the world, or at least the chance of it being the same as another randomly allocated ID anywhere in the world is statistically negligible. This can be implemented in at least two different ways. The first way is to keep track of all the IDs already issued to ensure that no two identifiers are issued the same (this only ensures the ID is unique within a given system, and requires more administration). The second way is to use a large number of bits for each ID and generate them randomly, such that even when allocated randomly without "ensuring" uniqueness per se, the chance of clashing with another such ID is negligibly small. An example of this which is a 128-bit GUID (Globally Unique Identifier). Hence in embodiment each AID in the directory is a randomly generated 128-bit GUID.

In embodiments, some or all of the actions in the directory may be predetermined by the operator of the coordinator service 108. These may be actions that are likely to be common to multiple different services, e.g. basic UI functions such as opening a window, closing a window, clicking OK and/or submitting a form.

Alternatively or additionally, the coordinator 108 may allow providers such as the first provider A to add action IDs for new types of action into the directory, which would tend to be more application-specific actions (e.g. submitting a tax return would be specific to an accounting service). To do this, the first service 104 invokes the respective instance of the platform agnostic code module 110a, by running code of the form (expressed here as pseudocode):

CodeModule->NewAction("submitted P60")

(where the metadata is optional). This may even be implemented in a single line of code of the language used to implement the first service 104. In response, the coordinator 108 generates a new action ID (e.g. in the form of a GUID) and adds this to the directory, along with any optional metadata specified.

To monitor for occurrences of a particular type of action, the coordinator 108 then defines an event in the directory. To do this, the first service 104 uses its instance of the platform agnostic code module 110a to submit to the coordinator 108 a request to become a reporter of an action with a particular action ID:

CodeModule->ReportOn(AID)

The coordinator 108 then records this in association with an ID of the first provider A, which acts as a reporter ID (RID) for the event. In addition, the second service 106 uses its instance of the platform agnostic code module 110b to submit to the coordinator 108 a request to become a subscriber to occurrences of the action originating from the first service 104:

CodeModule->SubscribeTo(AID, RID).

In response, the coordinator 108 records an identifier of the second provider, as a subscriber ID (SID), in association with the action AID and reporter ID of the event.

Again, in embodiments either or both of the above request operations by the code module 110a, 110b may be invoked by only a single respective line of code in the programming language used to implement the first and second services 104, 106 respectively.

Optionally, either the request from either the first service 104 or the second service 106 may also specify an ID of a particular user (UID), and/or an ID of a particular system or subsystem of the first service (SYID). And/or, the request (or a request) from the first service 104 may optionally specify further metadata in the form of a permissions setting, specifying an identifier or identifiers of one or more other providers who are permitted to subscribe to the event.

The coordinator 108 thus creates an entry in another section of the directory defining an event to be monitored for. This may take the following form.

| AID | [UID] | [SYID] | RID | SID | [Permissions] |
|---|---|---|---|---|---|
| fgh567 | hij789 | ijk890 | jkl901 | klm012 | klm012, lmn123 . . . |

(where columns in square brackets are optional). An event is therefore defined by (at least) a combination of action and reporting provider. I.e. the event is deemed to occur on condition that an action of the specified type is reported to occur from the particular specified provider, in this case A (but the same action type would not trigger the event if from another provider). If the user ID is used, this adds the additional condition that the event is only deemed to occur if the action also originates from the particular specified user. If the SYID, this adds the additional condition that the event is only deemed to occur if also originating from the particular specified system or subsystem.

In embodiments, each of the AID, RID, SID, and if used the UID and/or SYID, is globally unique (according to the same definition as given above). E.g. each may be a randomly generated 128-bit GUID.

The event having been thus set up in the directory of the coordinator 108, the process of monitoring for and reporting occurrences of the event may then proceed as follows.

At some later time, the first service 104 detects the occurrence of an instance of the awaited type of activity being performed through one of the user's user devices 102. In embodiments, the first service may receive the indication of this from the user device 102 expressed in the first service's own proprietary protocol (which would not necessarily be understandable to the coordinator 108 or second service 106). E.g.:

user=dave&action=FiledTaxReturn

The platform agnostic code module 110a running on the first service 104 then translates this to a combination of IDs from the above-described scheme of universal IDs: fgh567, jkl901 [hij789, ijk890], and reports this to the coordinator 108. In embodiments, the first service 104 may invoke this operation of the code module 110a by means on only a single line of code of the language in which the first service is programmed.

In response, the coordinator 108 reports the event to the second service 108, in embodiments still expressed in terms of the scheme of universal IDs: fgh567, jkl901 [hij789, ijk890]. Alternatively the coordinator 108 may wait to be polled by the second service 106 before reporting this. Either way, in embodiments, the platform agnostic code module 110b running on the second service 104 then translates this to the proprietary protocol of the second service 106 (which would not necessarily be understandable to the coordinator 108 or first service 104). E.g.:

EVENT: Dave, TaxReturnComplete

Note, if the permissions setting is used, this is only reported to second service 106 on condition that the ID of the second provider is specified in the permissions for the event.

Finally, in response to the event being expressed as occurring in the second service's own local protocol, the second service 106 then performs the relevant functionality to be integrated with the occurrence of the event, e.g. recording reward points or work credit against the user's account.

In embodiments either or both of the above translation operations by the code module 110a, 110b may be invoked by only a single respective line of code in the programming language used to implement the first and second services 104, 106 respectively.

Note that in the above communications flow, at no point does the first service 104 have to communicate with the second service 106. Also, at no point does any user device 102 have to communicate directly with the coordinator 108.

Note also that the instances of the code module 110 sent to first and second providers not necessarily same. Rather, though it is largely made up code common to all instances 110a, 110b (e.g. about 95% of the code), it also comprises a small portion (e.g. 5%) specific to interacting with the particular technology of the respective service 104, 106, such as to translate between the proprietary definition of an action and the action ID. In embodiments, the coordinator 108 is configured to dynamically generate the respective instance of the code module required by each service 104, 106 in response to a request from the respective service 104, 106; i.e. it is configured to generate and issue the respective instance of the code module 110a, 110b to order, as and when required by the respective service 104,106. Again, each such request may be invoked by a single line of code in the language in which the respective service 104, 106 is written.

Some more detailed examples are now described by reference to FIGS. 2 to 4.

Figure 2:
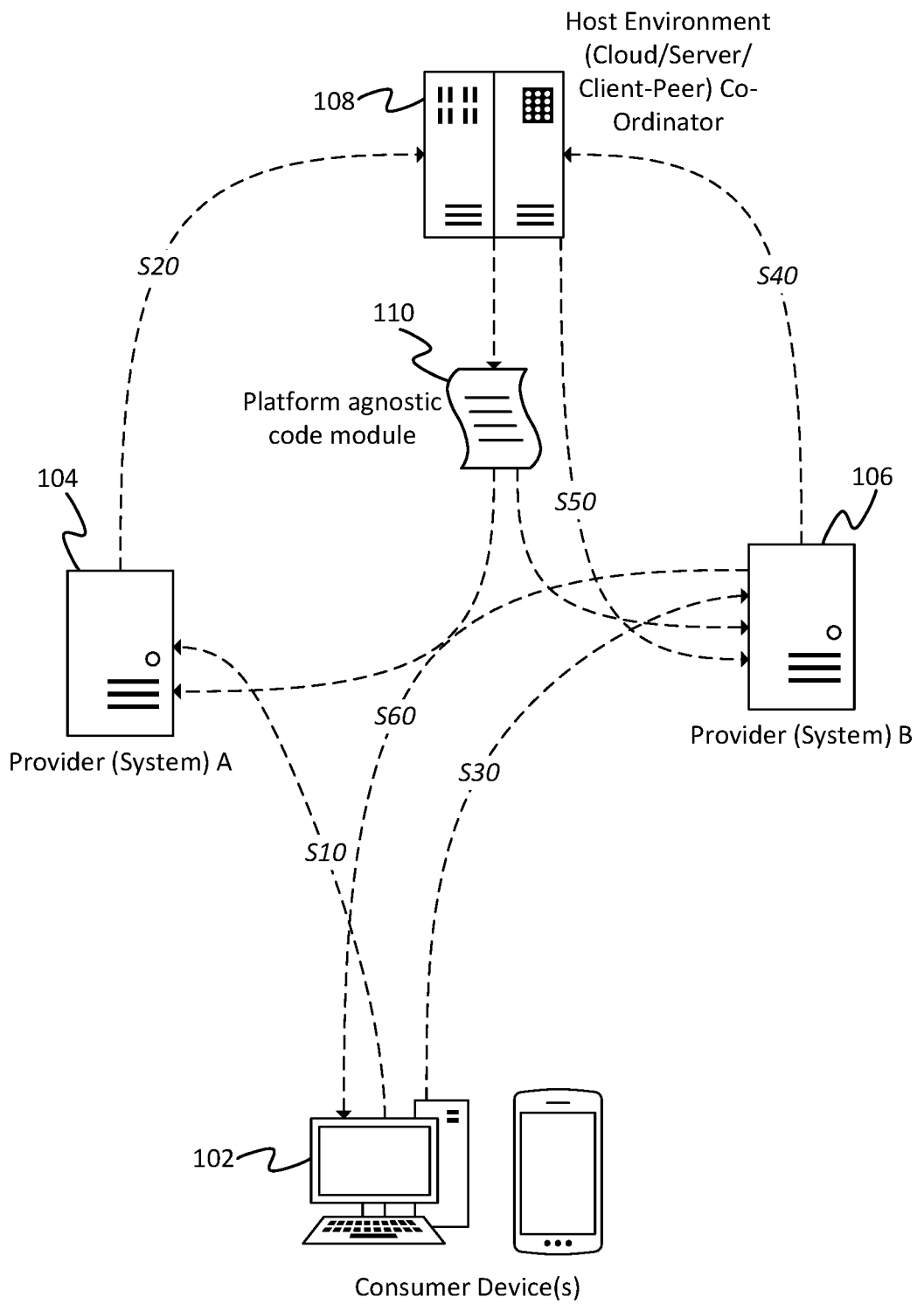
FIG. 2 is a schematic representation of a coordination process according to a first implementation.

FIG. 2 illustrates a simple system access example. The communications sequence is as follows. At step S10, a user device 102 submits a request to the first service 104 reporting that the user of the device 102 has completed a certain action. This may be expressed in terms of a proprietary protocol of the first service 104, or in terms of the AID and/or UID if the application on the user device 102 knows them. In response at step S20, the first service 104 submits a request to the coordinator 108 reporting that the action has occurred by specifying the action ID (AID) of the action, and the user ID (UID) of the user who completed that action. At step S30, the user uses the user device 102 to submit a request to access 'feature n . . . ' of the second service 106. At step S40, the second service 106 submits to the coordinator 108 a request asking 'has user <UID> completed action <AID>?' At step S50, the coordinator 108 confirms or denies this to the second service 108. At step S60, the second service 106 responds to the user device indicating whether access is granted or denied as appropriate.

Figure 3:
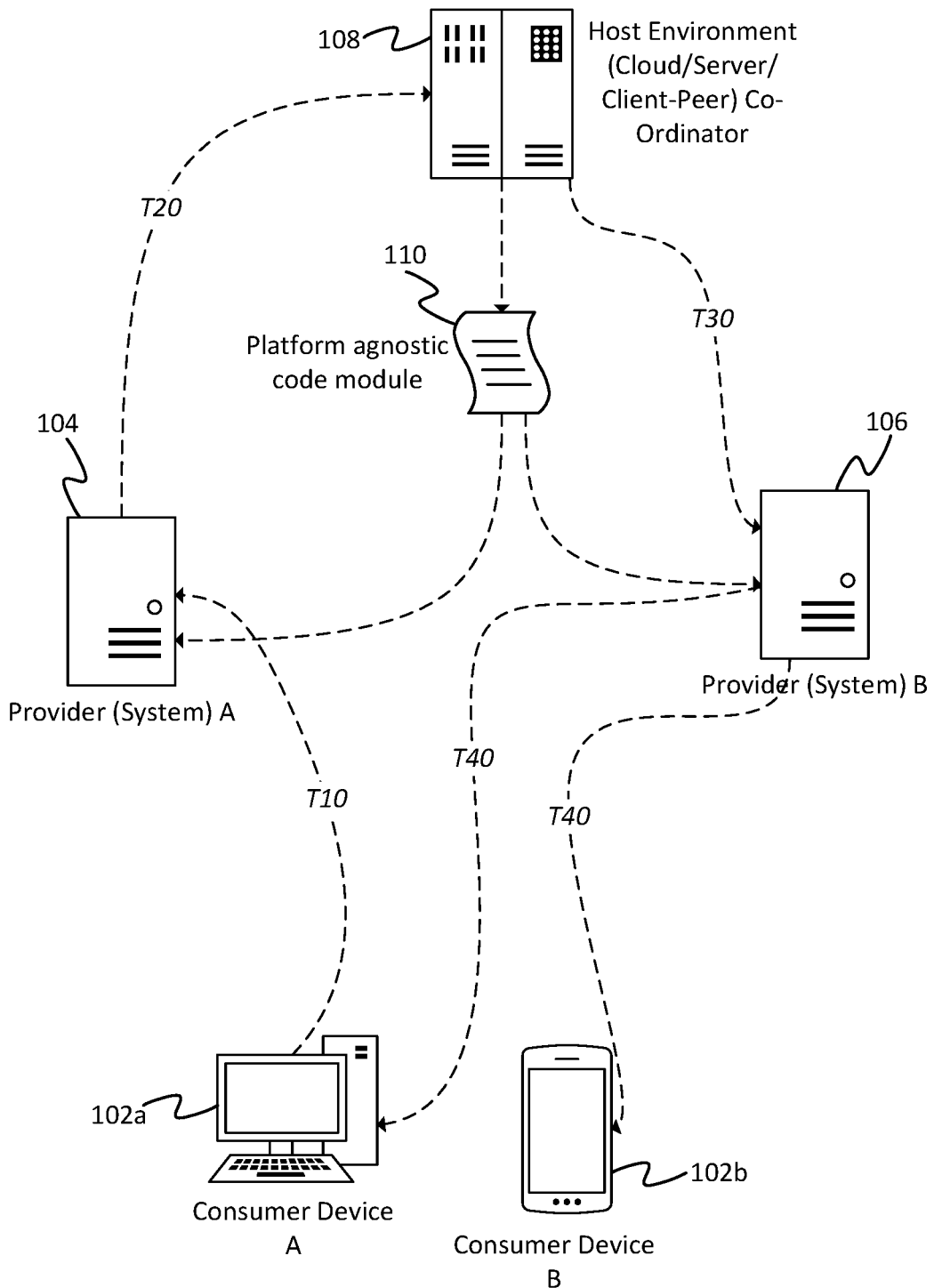
FIG. 3 is a schematic representation of a coordination process according to a first implementation.

FIG. 3 illustrates a push model or notification model. The communications sequence is as follows. At step T10, the user uses a first user device 102a to submit a request to the first service 104 specifying that the user has completed a certain action. This may be expressed in terms of a proprietary protocol of the first service 104, or in terms of the AID and/or UID if the application on the user device 102 knows them. At step T20, in response at step S20, the first service 104 submits a request to the coordinator 108 reporting that the action has occurred by specifying the action ID (AID) of the action, and the user ID (UID) of the user who completed that action. At step T30, the coordinator 108 responds by notifying the second service 106 that User <UID> on has completed action <AID>. In turn at step T40, the second service 106 notifies the user via a second user device 102b, or all the user's devices 102a, 102b that he or she is currently present on, that access to one or more features of the second service 106 have become available after completing the action successfully.

Figure 4:
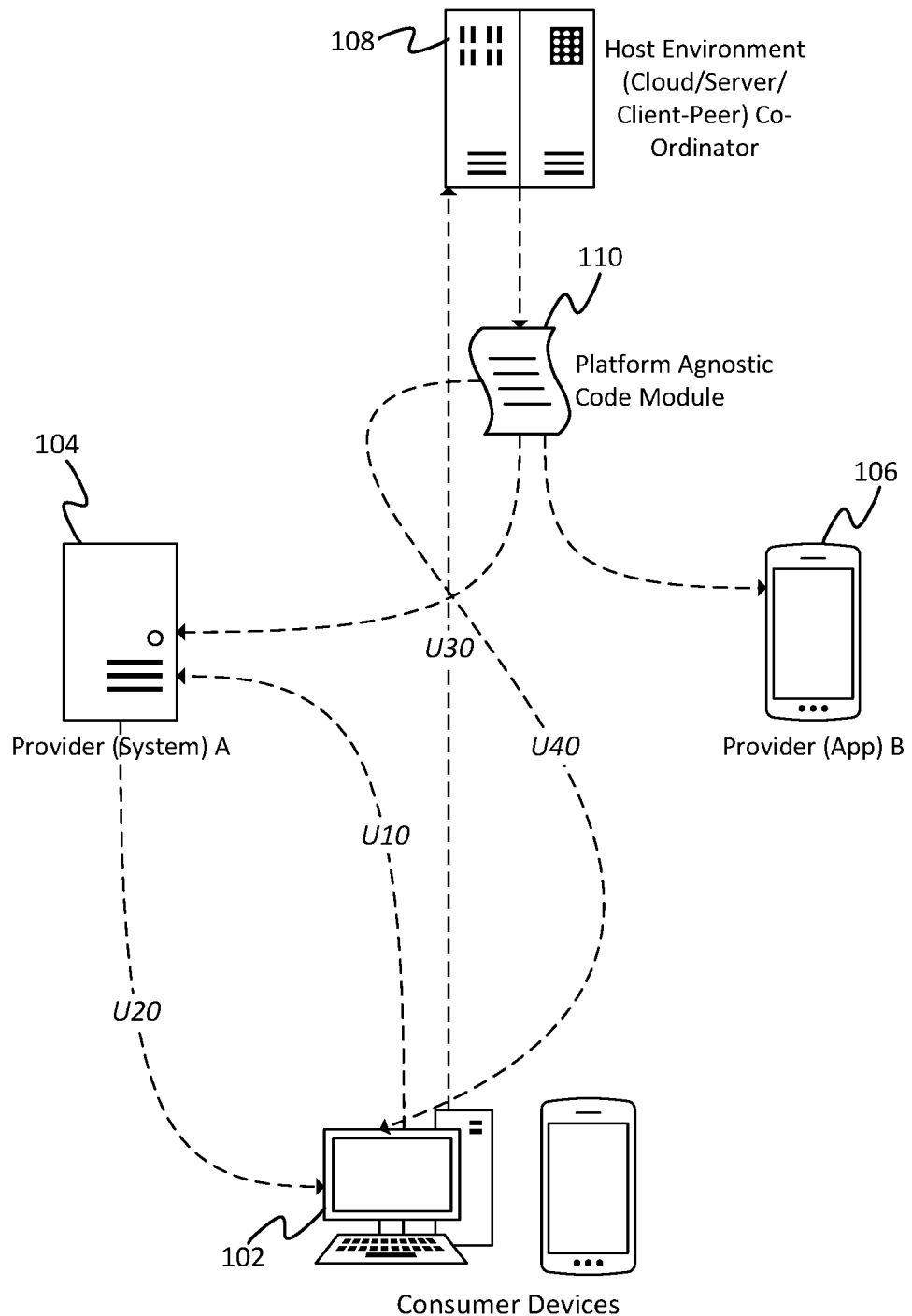
FIG. 4 is a schematic representation of a coordination process according to a first implementation.

FIG. 4 illustrates a further platform agnostic function. The communications sequence is as follows. At step U10, the user submits a request to as server of the first service 104 indicating that he or she wishes take part in coordination whilst consuming the first service 104. At step U20, the first service 104 responds by informing the user device 102 that to achieve this, it should contact the coordinator 108 in order to become a virtual endpoint to be coordinated. At step U30, the user device 102 contacts the coordinator 108 accordingly, saying 'provider A has sent me for coordination'. At step U40, the coordinator 108 responds to the user device 102 saying 'here is the code you require to be coordinated that you can interpret', and providing an instance of the platform agnostic code module 110 to be run on the user device 102 itself. In this case the first service may be considered to be implemented at least partially in an application on the user device 102 itself. The first service running on the user device 102 can then use the code module 110 it receives to coordinate with a second service 106 in a similar manner to that described above. In embodiments, the second service 106 may also be implemented wholly or partially as another application running on the user device 102.

It will be appreciated that the above embodiments have been described by way of example only.

For instance, in alternative embodiments, the first service 104 and/or second service 106 do not necessarily need to use respective proprietary definitions of the event, and hence the platform agnostic code module 110 does not necessarily need to perform a translating function in this respect. Instead, the first service may detect receive the indication of the action from the user device, and/or could express the occurrence of the action internally within its own protocol, directly in terms of the universal AID if pre-known. Similarly, the second service 106 could act directly based on the universal AID rather needing to translate to its own respective proprietary event definition first. The minimum is just for the first service 104 to send the action ID and provider ID to the coordinator 108, and for the coordinator 108 to report the action ID to second service.

Further, the scope of the present disclosure is not limited to only first and second providers A, B and first and second respective services 104, 106. In further embodiments, the upstream services of the coordinator 108 including access to the directory of universal IDs may also be made available to one or more other providers (either in the role analogous to the first provider, i.e. reporter, or second provider, i.e. subscriber). E.g. a third provider acting in a similar role as first provider could re-use an action ID created in the directory by the first provider 104 in order to report its own events to the second provider 106 and/or one or more other providers. And/or, a fourth provider acting in a similar role as the second provider could subscribe to the events of the first provider, third provider and/or one or more other providers.

Various other variants may fall within the scope of the present disclosure.

According to one aspect disclosed herein, there is provide a coordinating server for coordinating between a first computerized service being a service of a first provider and a second computerized service being a service of a second provider, the first service operating based on a first platform comprising a first operating system and/or first programming language and the second service operating based on a second, different platform comprising a second operating system and/or second programming language; wherein the coordinating server is configured to perform operations of: providing a directory comprising a respective action ID for each of a plurality of predefined types of action that can be performed by a human user through one of one or more user devices of the user; receiving a request from the first service requesting that the first service become a reporter of one of said types of action, and in response mapping an ID of the first provider as a reporter ID to the respective action identifier in an entry of the directory, thereby defining an event that will be deemed to occur when the user performs the respective type of action whilst using the first service; receiving a request from the second service requesting that the second service become a subscriber to said event, and in response mapping an ID of the second provider as a subscriber ID to said event in said entry of the directory; issuing a respective instance of a platform agnostic code module to each of the first service and the second service, the platform agnostic code module being configured to run on any of multiple different platforms including the different first and second platforms of the first and second services, thereby enabling the first service and second service to interact with the coordinating server; receiving from the first service, via the instance of the platform agnostic code module run by the first service, an indication of an occurrence of said one of the types of action, thereby indicating an occurrence of said event; and based on said directory, sending the respective action ID for said event to the second service, via the instance of the platform agnostic code module run by the second service, thereby causing the second service to serve one of the one or more user devices of said user in response to said event.

In embodiments, the instance of the platform agnostic code module run by the first service may be configured to: receive the indication of the occurrence of said type of action in the form of a first computer-readable proprietary definition of the first service, not understood by the second service; and translate the first proprietary definition to the respective action ID for reporting to the coordinator server.

In embodiments, the instance of the platform agnostic code module run by the second service may be configured to: translate the respective action ID to a second computer-readable proprietary definition used by the second service.

In embodiments, the coordinating server may be configured to dynamically generate the respective instance of the dynamic code module in response to a request from the first and/or second service respectively.

In embodiments, the coordinating server may be configured to receive a user ID of said user from the first service or second service and to include the ID of the user in said entry in the directory, and event may be deemed to occur on condition of the user with said user ID performing the respective type of action.

In embodiments, each of the action IDs, reporter ID, subscriber ID and/or user ID may be globally unique.

In embodiments, the directory further comprises metadata, wherein the metadata may comprise one or both of: a human-readable definition of the respective action mapped to each of one or more of the action IDs; and/or a permission setting specifying which of one or more providers are permitted to subscribe to the event, wherein said one or more providers include at least the second provider.

In embodiments, the first service may be implemented at least in part on a server of the first provider, and the coordinating server may be configured to receive said indication from the server of the first provider.

Alternatively, first service may be implemented at least in part in an application provided by the first provider but running on the user device through which said occurrence occurs, and the coordinating server may be configured to receive said indication from said application of the first provider as running on the device through which said occurrence occurs.

In embodiments, the second service may be implemented at least in part on a server of the second provider.

In embodiments, the second service may be implemented at least in part in an application provided by the second provider but running on the user device served by the second service.

In embodiments, the user device served by the second service may be a same user device as that from which said indication is received by the first service.

Alternatively, the user device served by the second service may be a different one of the user devices than that from which said indication is received by the first service.

In embodiments, the coordinating server may be configured to perform the sending of said action ID to the second service in response to the receipt of said indication from the first service In embodiments, the coordinating server may be configured to perform the sending of said action ID to the second service in response to a request from the second service asking the coordinator server to confirm whether the event occurred.

In embodiments, the predefined action types may comprise one or more default action types set by an operator of the coordinator server; and/or the coordinating server may comprise a mechanism enabling the first provider to submit an action addition request for a new one or more of said types of action, and to dynamically allocate the respective action ID in said directory in response to the action addition request.

In embodiments, the coordinating server may be configured to also send the respective action ID for said event to one or more further computerized services, other than just the second service, who subscribe to occurrences of the event; and/or one or more of said types of action may be available to be used by one or more further services other than the first service to report occurrences of one or more types of action.

In embodiments, the first service may never communicates with second service other than indirectly via coordinator.

In embodiments, the code module may be configured so that the submission of said indication from the first service to the coordinating server can be invoked by a single respective line of code of said programming language of the first service. In embodiments, the code module is configured so that said translation from the first proprietary definition to the action ID, can be invoked by a single respective line of code of said programming language of the first service. In embodiments, the code module is configured so that the defining of a new one of said action types can be invoked by a single respective line of code of said programming language of the first service. In embodiments, the code module is configured so that the receipt of the respective action ID by the second service from the coordinating server, can be invoked by a single respective line of code of said programming language of the second service. In embodiments, the code module is configured so that said translation from the action ID to the second proprietary definition can be invoked by a single respective line of code of said programming language of the second service.

According to another aspect disclosed herein, there is provided a system the first and second services and the coordinating server.

According to another aspect disclosed herein, there is provided a method for coordinating between a first computerized service being a service of a first provider and a second computerized service being a service of a second provider, the first service operating based on a first platform comprising a first operating system and/or first programming language and the second service operating based on a second, different platform comprising a second operating system and/or second programming language; wherein the method comprises: providing a directory comprising a respective action ID for each of a plurality of predefined types of action that can be performed by a human user through one of one or more user devices of the user; receiving a request from the first service requesting that the first service become a reporter of one of said types of action, and in response mapping an ID of the first provider as a reporter ID to the respective action identifier in an entry of the directory, thereby defining an event that will be deemed to occur when the user performs the respective type of action whilst using the first service; receiving a request from the second service requesting that the second service become a subscriber to said event, and in response mapping an ID of the second provider as a subscriber ID to said event in said entry of the directory; issuing a respective instance of a platform agnostic code module to each of the first service and the second service, the platform agnostic code module being configured to run on any of multiple different platforms including the different first and second platforms of the first and second services, thereby enabling the first service and second service to interact with the coordinating server; receiving from the first service, via the instance of the platform agnostic code module run by the first service, an indication of an occurrence of said one of the types of action, thereby indicating an occurrence of said event; and based on said directory, sending the respective action ID for said event to the second service, via the instance of the platform agnostic code module run by the second service, thereby causing the second service to serve one of the one or more user devices of said user in response to said event.

According to another aspect disclosed herein, there is provided a computer program product for coordinating between a first computerized service being a service of a first provider and a second computerized service being a service of a second provider, the first service operating based on a first platform comprising a first operating system and/or first programming language and the second service operating based on a second, different platform comprising a second operating system and/or second programming language; wherein the computer program product comprises code embodied on a computer-readable storage medium, and configured so as when run on a server of a coordinator service to perform operations of: providing a directory comprising a respective action ID for each of a plurality of predefined types of action that can be performed by a human user through one of one or more user devices of the user; receiving a request from the first service requesting that the first service become a reporter of one of said types of action, and in response mapping an ID of the first provider as a reporter ID to the respective action identifier in an entry of the directory, thereby defining an event that will be deemed to occur when the user performs the respective type of action whilst using the first service; receiving a request from the second service requesting that the second service become a subscriber to said event, and in response mapping an ID of the second provider as a subscriber ID to said event in said entry of the directory; issuing a respective instance of a platform agnostic code module to each of the first service and the second service, the platform agnostic code module being configured to run on any of multiple different platforms including the different first and second platforms of the first and second services, thereby enabling the first service and second service to interact with the coordinating server; receiving from the first service, via the instance of the platform agnostic code module run by the first service, an indication of an occurrence of said one of the types of action, thereby indicating an occurrence of said event; and based on said directory, sending the respective action ID for said event to the second service, via the instance of the platform agnostic code module run by the second service, thereby causing the second service to serve one of the one or more user devices of said user in response to said event.

According to another aspect disclosed herein, there may be provided a method comprising: (a) using a native code module (designed for a performing a first process) and a unified code module (designed for performing a second process), (b) enabling the unified code module to contact a server and retrieve a list of events (retrieved events) and an associated interaction ID for each event, (c) enabling the unified code module to monitor events in the native code module correspond to one of the retrieved events, (d) enabling the unified code module to detect the event when a retrieved event occurs within the native code module, and (e) enabling the unified code module to transmit information of the detected event (e.g. details of the particular event, the event's associated interaction ID, a user ID of an identity running the code modules) to the server. In embodiments, the server may maintain a database of the events that occur for each user.

Other variations and implementations may become apparent to a person skilled in the art given the disclosure herein. The scope of the present disclosure is not limited by the described embodiments, but only by the accompanying claims.

The invention claimed is:

1. A system comprising:
one or more processors; and
one or more memories having instructions stored thereon, the instructions being executable by the one or more processors to perform operations including:
designating a first device as a reporter of an action type and a second device as a subscriber to the action type;
issuing respective instances of a code module to the first device and the second device, the code module being configured to run on a first platform of the first device and a second platform of the second device, the first platform being different than the second platform;
receiving from the first device, via the instance of the code module run by the first device, an indication of an occurrence of an instance of the action type; and
sending, via the instance of the code module run by the second device, an action identifier for the instance of the action type to the second device.

2. A system as recited in claim 1, wherein the action type is selected from a directory of action types that can occur in response to user interaction with a user device.

3. A system as recited in claim 1, wherein the first platform comprises one or more of a different operating system or a different programming language than the second platform.

4. A system as recited in claim 1, wherein the operations further include providing a directory to one or more of the first device or the second device, the directory including an action identifier for the action type.

5. A system as recited in claim 1, wherein the operations further include providing a directory to one or more of the first device or the second device, the directory including an action identifier for the action type, and wherein said designating comprises mapping the first device as a reporter of the action identifier in the directory, and mapping the second device as a subscriber to the action identifier in the directory.

6. A system as recited in claim 1, wherein said designating is based on a request from the first device to be a reporter of the action type.

7. A system as recited in claim 1, wherein said designating is based on a request from the second device to be a subscriber to the action type.

8. A system as recited in claim 1, wherein the code module comprises a platform agnostic code module.

9. A system as recited in claim 1, wherein the instance of the action type comprises an indication of user input to a user device.

10. A method comprising:
submitting, via a first device, a request to coordinate with a service hosted by a second device;
receiving at the first device a notification to communicate with a third device and request to be designated as a virtual endpoint to be coordinated with the second device;
communicating a request to the third device requesting to be coordinated with the second device;
receiving a response to the request that includes an instance of a code module; and
utilizing the code module to report an action that occurs on the first device to the service hosted by the second device, and to receive a response to the action.

11. A method as recited in claim 10, wherein the first device includes an application that is configured to implement functionality of the service hosted by the second device.

12. A method as recited in claim 10, wherein the first device comprises an end user device that consumes the service hosted by the second device.

13. A method as recited in claim 10, wherein the code module is agnostic to a platform utilized by the first device.

14. A method as recited in claim 10, wherein said utilizing is implemented via communication between the code module on the first device, and a different instance of the code module on the second device.

15. A method comprising:
receiving a request from a first device to coordinate with a service hosted by a second device;
communicating a response to the first device that includes an instance of a code module that is usable to enable communication between the first device and the service hosted by the second device;
receiving a notification from the service hosted by the second device that an action occurs on the first device; and
communicating a notification to a service hosted by a third device that the action occurs effective to enable the third device to communicate a response to the action to the first device.

16. A method as recited in claim 15, wherein the request from the first device comprises a request to be a reporter of an action type that corresponds to the action identified in the notification from the service hosted by the second device.

17. A method as recited in claim 15, further comprising communicating a different instance of the code module to the second device.

18. A method as recited in claim 15, further comprising receiving a request from the third device to be a subscriber to an action type that corresponds to the action identified in the notification from the service hosted by the second device, and communicating a different instance of the code module to the third device.

19. A method as recited in claim 15, wherein the code module comprises a platform agnostic code module.

20. A method as recited in claim 15, wherein the action that occurs on the first device corresponds to an action type identifier, and wherein the method further comprises mapping the second device as a reporter of the action type identifier, and mapping the third device as a subscriber to the action type identifier.

* * * * *